United States Patent [19]

Anderson

[11] Patent Number: 5,704,061
[45] Date of Patent: *Dec. 30, 1997

[54] METHOD AND APPARATUS FOR CREATING CYLINDRICAL THREE DIMENSIONAL PICTURE

[75] Inventor: Victor G. Anderson, Arlington, Tex.

[73] Assignee: Pinnacle Brands, Inc., Grand Prairie, Tex.

[ * ] Notice: The term of this patent shall not extend beyond the expiration date of Pat. No. 5,365,294.

[21] Appl. No.: 621,799

[22] Filed: Mar. 22, 1996

Related U.S. Application Data

[63] Continuation of Ser. No. 330,862, Dec. 27, 1994, abandoned, which is a continuation-in-part of Ser. No. 195,194, Feb. 14, 1994, which is a continuation-in-part of Ser. No. 2,969, Jan. 11, 1993, Pat. No. 5,365,294.

[51] Int. Cl.[6] .................................................. G03B 35/00
[52] U.S. Cl. ........................................ 396/330; 352/58
[58] Field of Search ................................ 352/53, 58, 81, 352/101; 354/110, 112, 292; 40/430; 396/324, 330

[56] References Cited

U.S. PATENT DOCUMENTS

| | | | |
|---|---|---|---|
| 1,930,228 | 10/1933 | Draper | 88/16.6 |
| 2,661,651 | 12/1953 | Stipek | 88/16.6 |
| 2,928,313 | 3/1960 | Hattori | 88/16 |
| 3,178,720 | 4/1965 | Collender | 352/38 |
| 3,683,772 | 8/1972 | Jones | 95/18 P |
| 3,815,979 | 6/1974 | Collender | 352/38 |
| 4,089,597 | 5/1978 | Collender | 352/53 |
| 4,158,487 | 6/1979 | Collender | 352/58 |
| 4,176,923 | 12/1979 | Collender | 352/58 |
| 4,231,642 | 11/1980 | Collender | 352/58 |
| 4,349,252 | 9/1982 | Collender | 352/58 |
| 4,364,627 | 12/1982 | Haines | 350/3.76 |
| 4,414,316 | 11/1983 | Conley | 430/496 |
| 4,431,280 | 2/1984 | Carvelo | 352/58 |
| 4,547,050 | 10/1985 | Collender | 352/58 |
| 4,552,442 | 11/1985 | Street | 354/112 |
| 4,596,458 | 6/1986 | Gundlach | 354/22 |
| 4,597,634 | 7/1986 | Steenblik | 350/144 |
| 4,717,239 | 1/1988 | Steenblik | 250/144 |
| 4,740,073 | 4/1988 | Meacham | 352/58 |
| 4,825,234 | 4/1989 | Cai | 354/112 |
| 4,870,768 | 10/1989 | Watt et al. | 40/430 |
| 4,895,790 | 1/1990 | Swanson et al. | 430/321 |
| 5,002,364 | 3/1991 | Steenblik | 350/144 |
| 5,028,518 | 7/1991 | Lyons et al. | 430/506 |
| 5,083,199 | 1/1992 | Borner | 358/88 |
| 5,083,389 | 1/1992 | Alperin | 40/539 |
| 5,103,325 | 4/1992 | Andrews et al. | 359/23 |
| 5,146,246 | 9/1992 | Marks | 353/7 |
| 5,148,310 | 9/1992 | Batchko | 359/479 |
| 5,365,294 | 11/1994 | Anderson | 354/112 |
| 5,493,427 | 2/1996 | Nomura et al. | 359/40 |

OTHER PUBLICATIONS

Andrews, Edmund L., "Patents: New Way to Create 3-Dimensional Images," New York Times, Nov. 16, 1992.

Primary Examiner—Safet Metjahic
Assistant Examiner—Nicholas J. Tuccillo
Attorney, Agent, or Firm—Baker & Botts, L.L.P.

[57] ABSTRACT

A cylindrical three dimensional picture capable of being viewed through an angle of 360° or exhibiting animated motion includes a cylinder surrounded by a photograph, in turn surrounded by a lenticular lens or parallax barrier strip. The photograph is made from a photo emulsion that is exposed and subsequently developed for viewing. The photo emulsion is exposed to the subject, or images of the subject, about an angle of 360° or while in animated motion, through the lenticular lens or parallax barrier strip.

20 Claims, 7 Drawing Sheets

PARALLEL RAYS FROM PROJECTED IMAGE

PARALLEL RAYS FROM PROJECTED IMAGE

PARALLEL RAYS FROM PROJECTED IMAGE

Fig.15

METHOD AND APPARATUS FOR CREATING CYLINDRICAL THREE DIMENSIONAL PICTURE

CROSS-REFERENCE TO RELATED APPLICATION

This application is a continuation of application Ser. No. 08/330,862, filed Oct. 27, 1994, entitled "Method and Apparatus for Creating Cylindrical Three Dimensional Picture," by Victor G. Anderson, now abandoned; which is a continuation-in-part of U.S. application Ser. No. 08/195,194, filed Feb. 14, 1994, pending; which is a continuation-in-part of U.S. application Ser. No. 08/002,969, filed Jan. 11, 1993, now U.S. Pat. No. 5,365,294, granted Nov. 15, 1994.

TECHNICAL FIELD

This Invention relates to a method and apparatus for producing a three dimensional picture and, more particularly, to a method and apparatus for producing a cylindrical 3D picture showing an animated sequence of images.

BACKGROUND OF THE INVENTION

Since the birth of photography, photographers and viewers have strived to make pictures more realistic by creating three dimensional images. This has lead to the development of a wide range of methods and equipment for recording and viewing three dimensional images. Such methods include: the viewing of the images through special lenses, such as 3D glasses for the individual viewer; the creation of images on a flat surface through use of concentric circular lenses in conjunction with line screens having alternate opaque and transparent vertical lines; creating three dimensional images through use of a plurality of angularly spaced mirrors; viewing images through rapidly moving screens having spaced-apart openings; viewing a television screen through a series of vertically extending cylindrical lenses mounted to the television screen between the viewer and the television screen; and rapidly rotating a screen displaying a fast changing series of images generated by an external projector rotating synchronously with the screen.

SUMMARY OF THE INVENTION

The 3D picture and the method and apparatus for creating the 3D picture of the present invention includes a substrate for supporting a photograph comprising a cylinder of any selected size. The photograph contains sequential images of a subject. Mounted over the photograph, and also supported by the cylinder, is a lenticular lens or a parallax barrier strip (black line screen) through which the photograph, and hence the subject recorded thereon, is viewed.

The sequence of images recorded on the photograph preferably show different views of the subject. A prior application by this inventor is directed to a photograph having sequential images of the subject taken at different angles (preferable around the subject) for 3D viewing of the subject. The present invention utilizes a photograph of a subject wherein each image in the sequence of images shows the subject from substantially the same angle but positioned in a slightly different manner to that of another image in the sequence. When the photograph is mounted on the cylinder and viewed through the lenticular lens or parallax barrier strip, the subject appears to be positioned at the center of the cylinder. Furthermore, as the cylinder is rotated about its axis, the positioning of the subject changes in an animated fashion.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
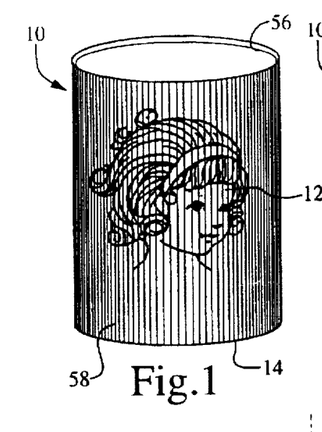
FIGS. 1–3 are side views of a cylindrical three dimensional picture produced in accordance with one embodiment of the present invention.
Figure 2:
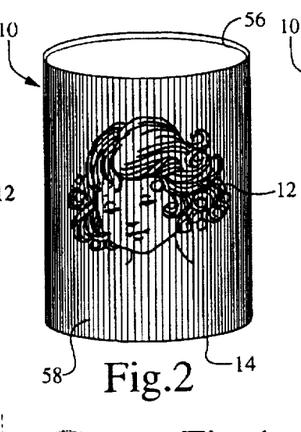
Figure 3:
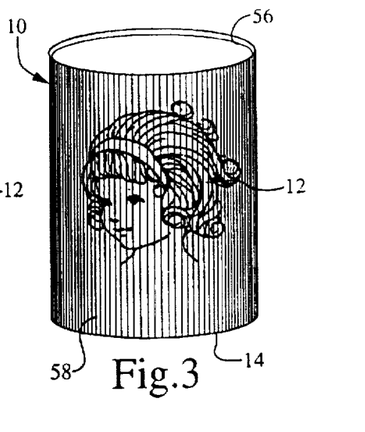

Referring now to the Drawings and more particularly to FIGS. 1, 2 and 3, there is shown a first embodiment of the cylindrical three dimensional picture 10 of the present invention capable of being viewed through an angle of 360°. As the picture 10 is rotated by the viewer, such that it is viewed from a variety of different angles (three of which are represented in FIGS. 1, 2 and 3), the subject 12 appears to be encased within a viewing cylinder 14 and have three dimensional (3D) characteristics.

Figure 4:
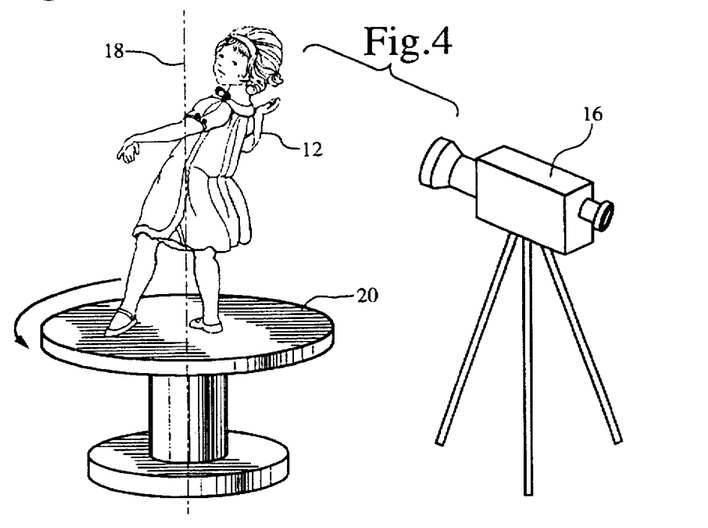
FIG. 4 is a drawing illustrating the manner in which the subject of the cylindrical 3D picture of FIG. 1 is photographed as the subject rotates through a 360° angle in an indirect exposure method incorporating a first embodiment method of the present invention and a direct exposure method incorporating a second embodiment method of the present invention.
Figure 5:
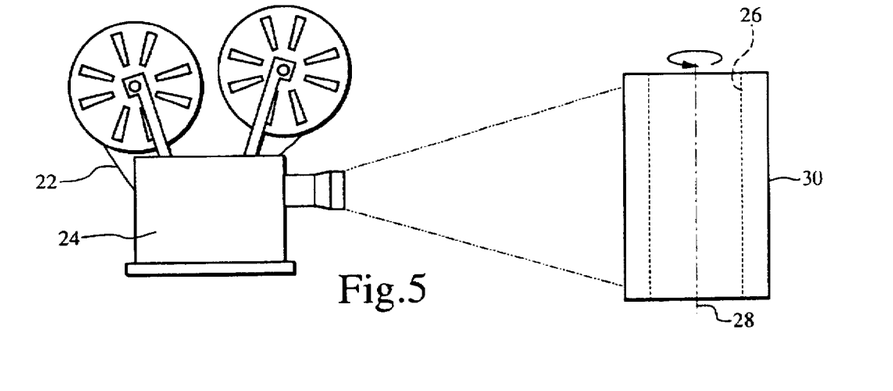
FIG. 5 is a drawing illustrating a method for exposing the images photographed in FIG. 4 through a lenticular lens onto a film strip surrounding a cylinder as the cylinder rotates 360° in the first embodiment method of the present invention.

Referring now to FIGS. 4 and 5, there is illustrated a first embodiment method for producing the cylindrical 3D picture of the present invention. To overcome the viewing angle limitations of prior art 3D pictures necessary to accomplish the cylindrical 3D picture of FIGS. 1, 2 and 3, in a first embodiment of the present invention, the subject 12 is sequentially photographed with a camera 16 as the subject is rotated 360° on a turntable 20 positioned for rotational movement about a vertically extending axis 18. In the first embodiment of the method of the present invention, the camera 16 is preferably a multiple imaging camera. The sequential images of the subject photographed through 360° are preserved on film 22 (see, FIG. 5).

Figures 6, 7:
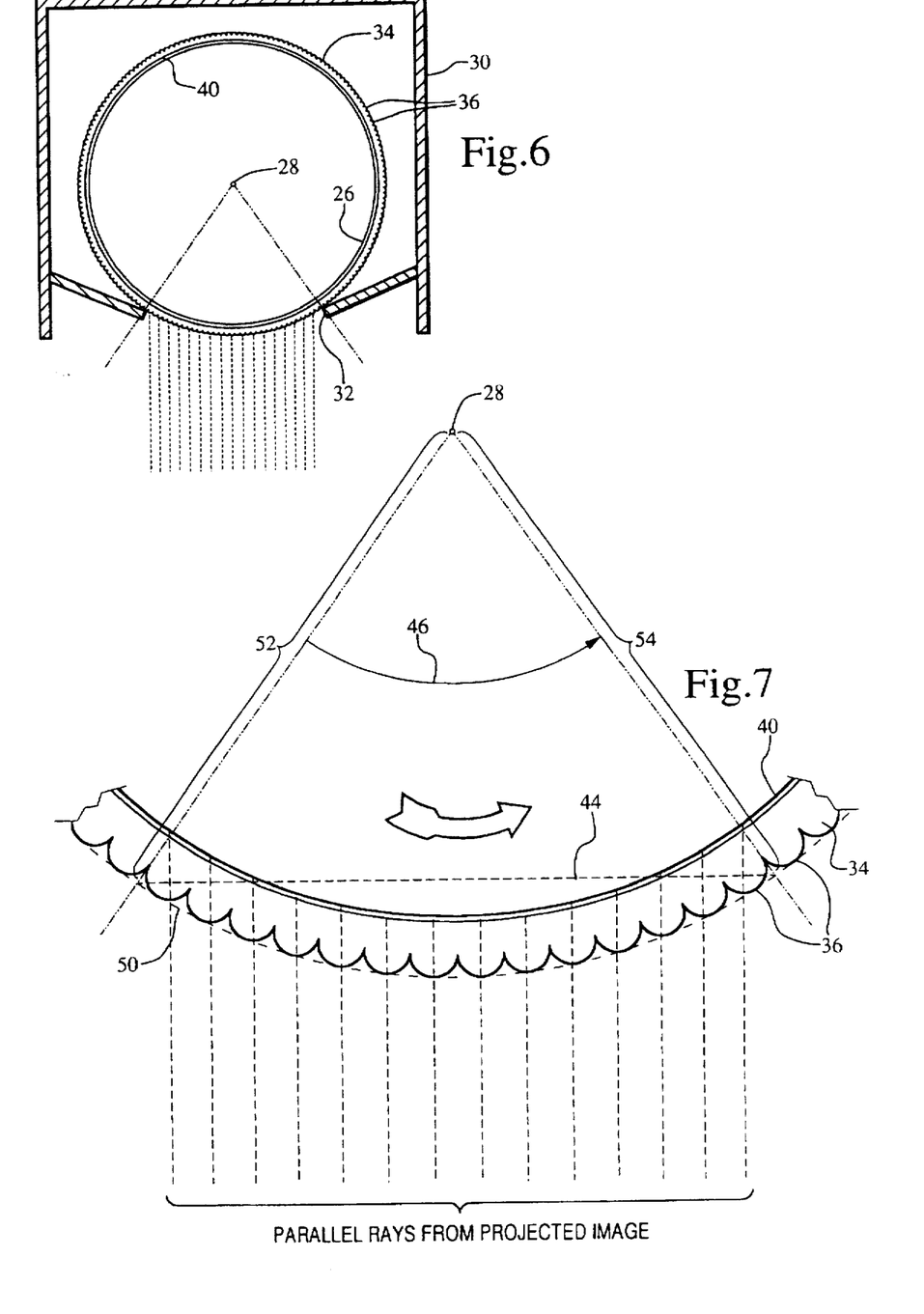
FIG. 6 is a sectional view of the cylinder of FIG. 5 within a housing having an aperture for exposing the film strip as illustrated in FIG. 5.
FIG. 7 is a partial top view of the cylinder of FIG. 6 illustrating the exposure of the lenticular film strip through the lenticular lens as the cylinder rotates.

The images are then projected through a projection device 24 onto an exposure cylinder 26, as the cylinder 26 rotates through an angle of 360° about a vertically extending axis 28. As illustrated in FIGS. 5 and 6, the exposure cylinder 26 is contained within a light tight housing 30 having an aperture 32 therein for projection of the multiple images from the film 22 onto the exposure cylinder 26 as it rotates adjacent the aperture 32.

Referring now to FIGS. 6 and 7, surrounding the exposure cylinder 26 is a lenticular lens 34 formed of a plurality of individual, semi-circular, vertically extending, parallel lenticulars 36 defining a first lenticulated surface and a second smooth surface 40 opposite the lenticulated surface containing the lenticular lenses. Surrounding the exposure cylinder 26 and facing outwardly toward the smooth surface 40 of the lenticular lens 34 is a photo emulsion or film layer 42. As the cylinder 26 rotates through an angle of 360° about the vertical axis 28, the film/emulsion layer 42 is exposed to the sequential images as the surface of the cylinder 26 rotates through the aperture 32.

Figure 8:
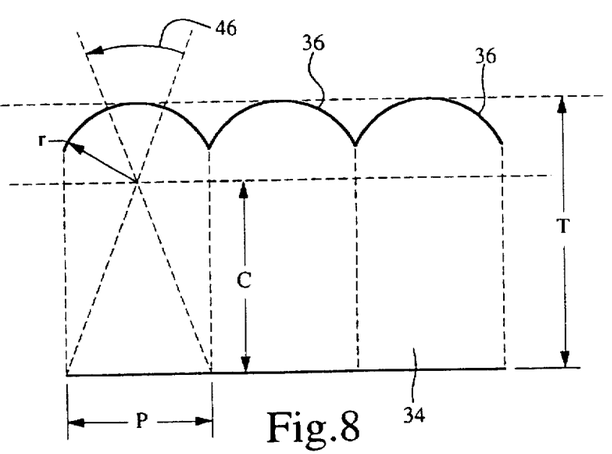
FIG. 8 is a partial cross section of the lenticular lens of FIG. 6 illustrating the calculation of the lens lobe angle.

The width of the aperture 32 is equal to the subtended chord 44, FIG. 7, of the lens lobe angle 46, FIGS. 7 and 8. The lens lobe angle 46 is determined by the lens thickness and lens frequency or pitch. Although a variety of lobe angles may be used, in the preferred embodiment of the invention a lobe angle of 72° has been chosen because it represents the maximum angle for the sharpest exposure of the underlying film/emulsion layer 42. Smaller angles that will result in a narrower image are also possible, but detract from the viewability of the image.

Referring now to FIGS. 6, 7 and 8, the width 44 of the aperture 32 corresponds to the lens lobe angle 46, which is determined by the formula: Lobe angle $(\angle°)=2\{\tan^{-1}(0.5P/C)\}$, where P (pitch)=1/L and L is the number of individual lenticulars 36 per inch, and C=T−r, where T is the thickness of the lens 34 (FIG. 8) and is the product of the index of refraction for the particular lens material and the radius of curvature (r) of the individual lenticular 36. For a lens made from polyvinyl chloride, for example, T=2.7r; and for polystyrene, T=2.43r.

The width 44 of the aperture 32 is equal to the subtended chord of the lens lobe angle 46, or $2\{\sin (\angle°/2) R\}$, where R (shown at 52) is the radius 54 of the desired cylinder plus T, the thickness of the lenticular lens 34.

Figure 9:
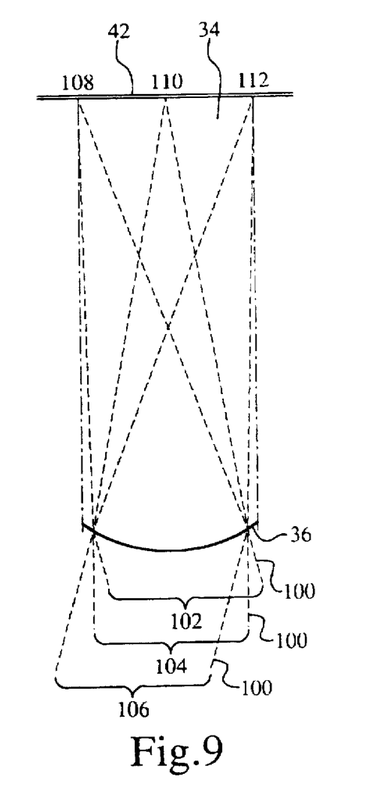
FIG. 9 is a diagrammatic cross section of an individual lenticular of the lenticular lens of FIG. 6, illustrating representative angles of exposure of the film strip with respect to each individual lenticular.
Figure 10:
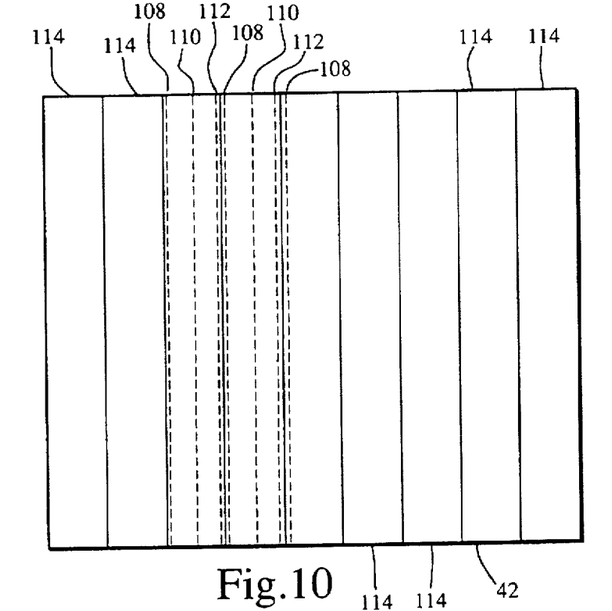
FIG. 10 is a front view of the film strip illustrating the areas of exposure in relation to individual lenticulars of the lenticular lens.

Referring now to FIGS. 6, 9, and 10, as the exposure cylinder 26 rotates, the projection beam 100 strikes the surface of the individual lenticulars 36 formed in lens 34 from a series of representative angles as shown at 102, 104, and 106 (FIG. 9). As the projected beam 100 strikes the surface of the lenticulars 36, the rays are refracted and converge at focal points 108, 110, and 112 (FIG. 9), corresponding to the contact angles shown at 102, 104, and 106 (FIG. 9), respectively, exposing the film/emulsion layer 42.

As illustrated in FIG. 10, exposure of the film/emulsion layer 42, at focal points 108, 110, and 112 is repeated for each individual lenticular 36 represented by lines 114. It is understood that the film/emulsion layer 42 will be exposed along a multiplicity of focal points corresponding to angles of contact of the beam 100 through the lenticular lens 34, with focal points 108, 110, and 112 merely being representative for purposes of illustration of the present invention. Thus, each exposed lenticular 36 across the aperture 32 (FIG. 6) continues to record its share of the sequential images projected thereon as it travels from one side of the aperture 32 to the other, finally exposing the entire 360° of film/emulsion layer 42 surrounding the cylinder 26 (FIG. 6) as the rotation is completed.

Referring again to FIGS. 1 and 6, once exposed through the lenticular lens 34, the film/emulsion layer 42 is processed and the resulting photograph 56 mounted surrounding the viewing cylinder 14 having the same circumference as the exposure cylinder 26. A second lenticular lens 58 surrounds the photograph 56 to create an illusion of the subject 12 being reduced in size and encased as a three dimensional image within the viewing cylinder 14. Although in the preferred first embodiment of the present invention, the photograph 56 is disposed between the viewing cylinder 14 and the lenticular lens 58, the lens 58 may itself be shaped to form the viewing cylinder 14, such that the photograph 56 is placed within the lens 58 for viewing without a separate cylinder 14. Likewise, although in the preferred embodiment of the present invention the viewing substrate is cylindrical in shape, other geometrical shapes may be used.

Referring again to FIGS. 4 and 6, there is illustrated a method for direct exposure of the film/emulsion layer 42, incorporating a third embodiment method for producing the cylindrical 3D picture 10 of the present invention. In the direct exposure method, the camera 16 is a conventional viewing camera modified by replacing the film holder with the housing 30 and exposure cylinder 26 mounted therein. The film/emulsion layer 42 is mounted onto the cylinder 26 and surrounded by the lenticular lens 34. The vertical aperture 32 is in alignment with the camera 16 aperture for exposing the film/emulsion layer 42 through the lenticular lens 34. As the rotating subject 12 is photographed, the exposure cylinder 26 rotates within the housing 30 at a rate of speed equal to the rate of rotation of the subject 12, thereby directly exposing the film/emulsion layer 42 to sequential images of the subject 12 through the lenticular lens 34 as the exposure cylinder 26 rotates past the aperture 32.

Figure 11:
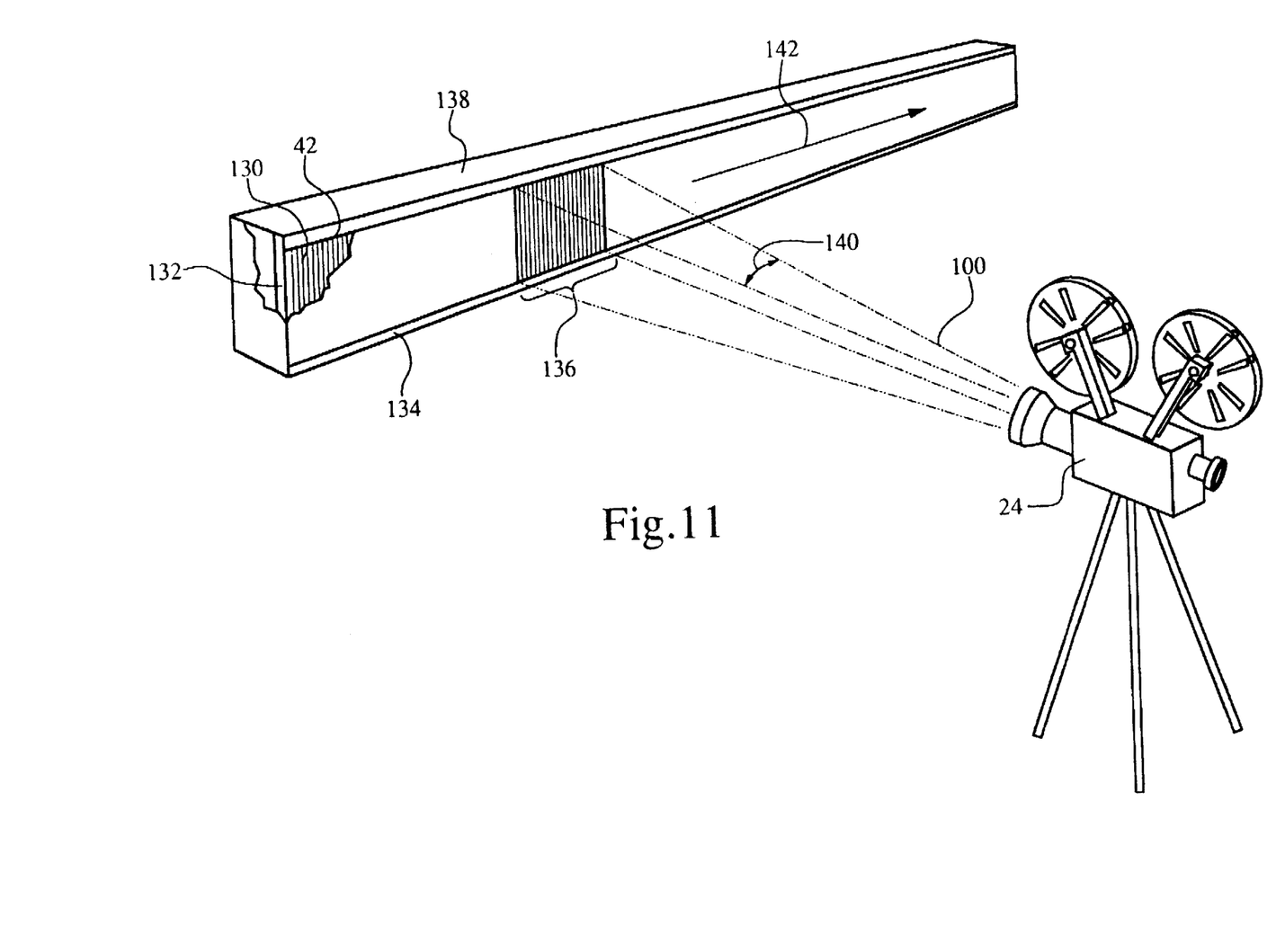
FIG. 11 is a drawing illustrating a linear method for exposing the film strip through a lenticular lens incorporating a third embodiment method of the present invention.

Referring now to FIG. 11, there is illustrated a linear method for exposing the film/emulsion layer 42 through a lenticular lens 130, incorporating a third embodiment method for producing the cylindrical 3D picture 10 of the present invention. Equal widths of film/emulsion layer 42 and the lenticular lens 130, representing the circumference of the desired viewing cylinder, are mounted onto a vacuum film holder 132 for linear movement along a track 134 mounted within a light tight enclosure 138. The light tight enclosure 138 has an exposing aperture 136 between the vacuum film holder 132 and the projection device 24. As the vacuum film holder 132 and film 42 and lens 130 mounted thereon move linearly in the direction indicated by arrow 142 along the track 134 within the enclosure 138, the film 42 is exposed by the beam 100 through the lens 130 as the film holder 132, film 42, and lens 130 pass the aperture 136.

Referring now to FIGS. 9 and 11, the representative contact angles 102, 104, and 106 (FIG. 9) of the image beam 100 projected from the projection device 24 are achieved through linear movement of the lenticular lens 130 across the projected image beam 100. In the preferred embodiment of the invention, the length of the vacuum film holder 132 is equal to the circumference of the proposed viewing cylinder 14. As with the first embodiment method for making the cylindrical 3D picture 10, the aperture 136 through which the film 42 is exposed is equal in width to the subtended chord of the lens lobe angle, where the projection angle 140 is equal to the lens lobe angle, and the length of the subtended chord is determined by the distance of the projection device 24 from the lens surface.

It has been determined that a lens lobe angle of 20° produces a 3D image of suitable resolution when the film is exposed linearly. Due to the narrow lens lobe angle, linear exposure requires exposure of the film/emulsion layer 42 to multiple images of the subject photographed through a full 360° angle of rotation, plus an additional one-fifth of the rotation to expose a length of film/emulsion layer 42 equal to the circumference of the viewing cylinder 14.

Figure 12:
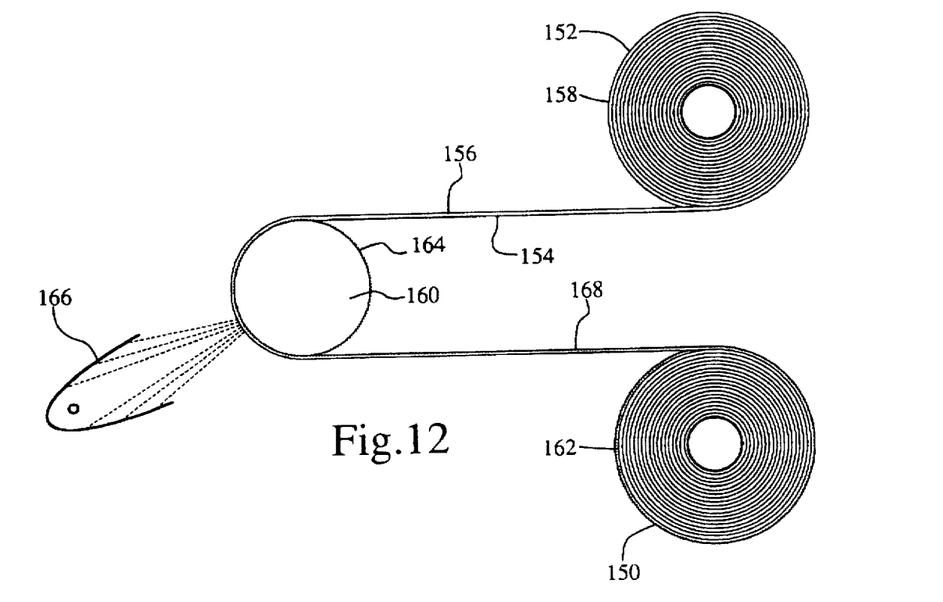
FIG. 12 is a drawing illustrating the formation of a unitary lenticular film strip.

Referring now to FIG. 12, a unitary lenticular lens film strip 150 may be substituted for the separate lenticular lens 34 and associated film/emulsion layer 42. A plastic film base material 152 having a first side 154 and a second side 156 is coated on the first side 154 with an ultraviolet polymer. The base material 152 is wound from a first film canister 158 over a negative lenticulated cylinder 160 and onto a second film canister 162. Adjacent, vertically extending parallel inductions 164 cover the surface of the negative lenticulated cylinder 160 and correspond to the curvature of a desired lenticular lens.

As the coated base material 152 passes over the negative lenticulated cylinder 160, it is exposed to an ultraviolet light source 166, which cures and solidifies the coating creating the lenses on the first side 154 of the base material 152 corresponding to the indentions 164 in the surface of the negative lenticulated cylinder 160. The resulting lenticular lens film strip 168, is wound onto the second film canister 162 from the negative lenticulated cylinder 160.

Figure 13:
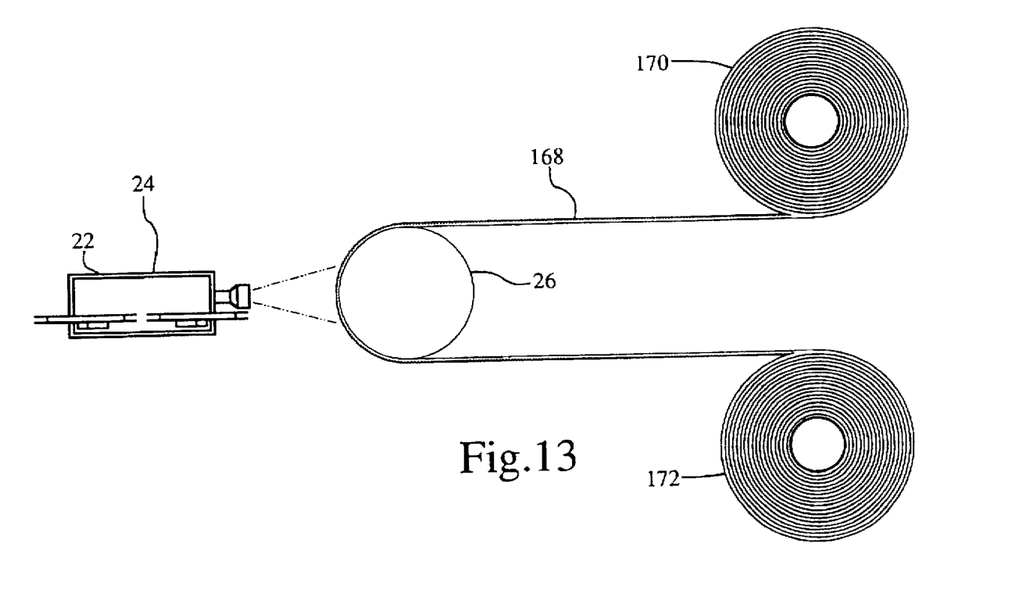
FIG. 13 is a drawing illustrating the exposure of the unitary lenticular film strip of FIG. 12.

Referring now to FIG. 13, the lenticular lens film strip 168 is coated on the second side 156 with a photo emulsion and wound onto a third light tight film canister 170 for storage and subsequent use in making the cylindrical 3D picture 10 of the present invention. When exposing the lenticular lens film strip 168, sequential images from the multiple image film 22 are projected by the projection device 24 onto the lens film strip 168 as it rotates around the exposure cylinder 26. The multiple image film strip 22 is a continuous loop such that the series of sequential multiple images taken of the subject as it rotates 360° is repeatedly projected onto the lens film strip 168, with an exposure of one complete series equal in length to the circumference of the viewing cylinder 14.

The exposed lens film strip 168 is then wound on a fourth film canister 172 for storage and subsequent developing of the film 168. Upon developing the lens film strip 168, the resultant photographs of the repeated series of sequential, multiple images are separated by cutting the photographs produced from the film strip 168 into lengths equal to the circumference of the viewing cylinder 14. Each segment is then mounted to a viewing cylinder or is cylinderized separately without a cylinder, thereby producing a plurality of cylindrical 3D pictures 10. The use of the unitary lens film strip 168 alleviates blurring or fuzzy images as a result of improper alignment (registration) between a separate flexible lenticular lens and underlying photograph when mounted on the viewing cylinder, and allows production of multiple copies of the 3D picture 10 at one time.

Figure 14:
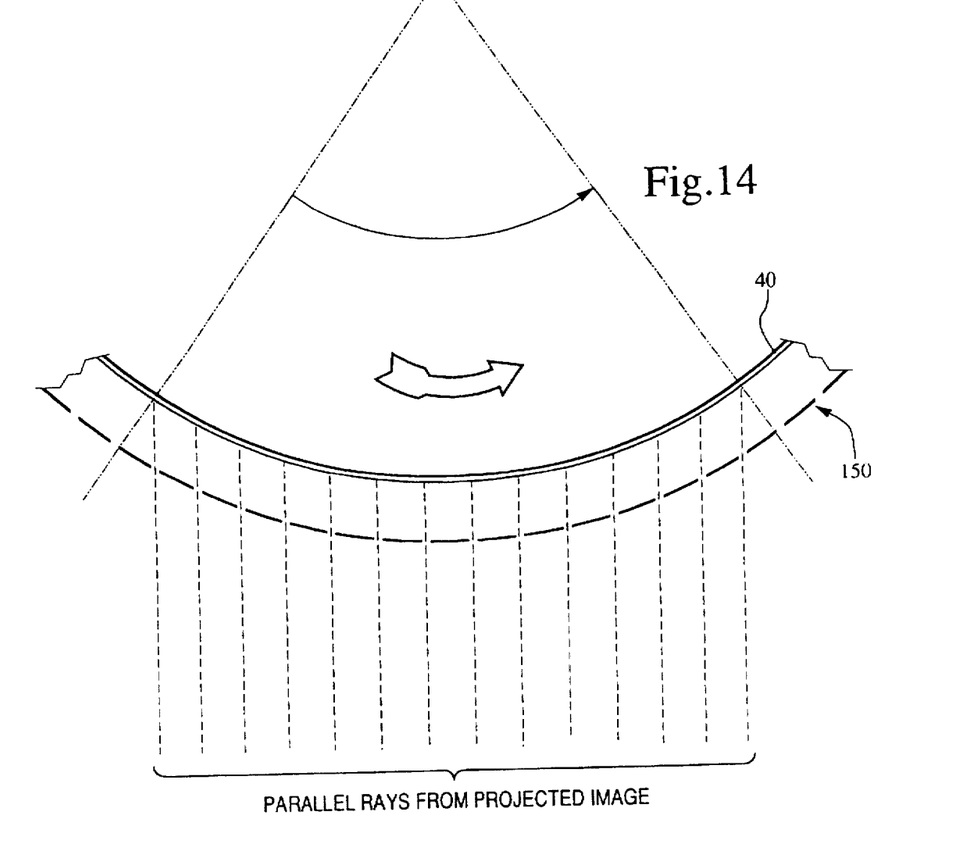
FIG. 14 shows a modified view of FIG. 7 incorporating a parallax barrier strip in place of the lenticular lens.
Figure 15:
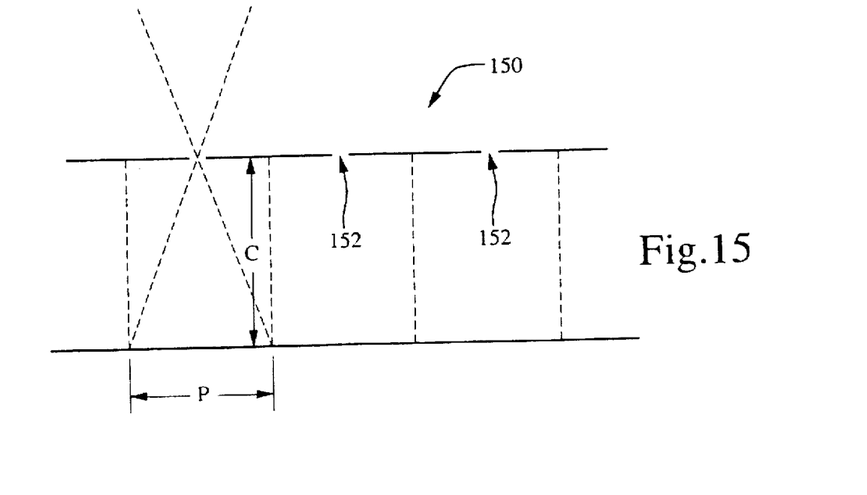
FIG. 15 shows a modified view of FIG. 8 incorporating a parallax barrier strip in place of the lenticular lens.
Figure 16:
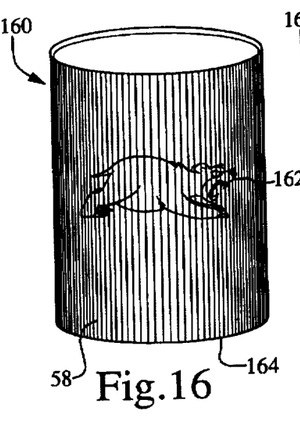
FIGS. 16–22 show a series of side views of a three dimensional animated image produced in accordance with a second embodiment of the three dimensional picture of the present invention.
Figure 17:
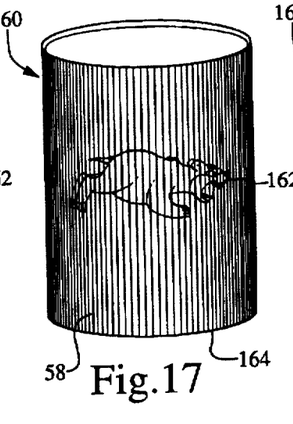
Figure 18:
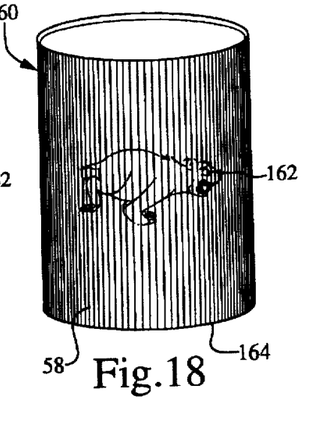
Figure 19:
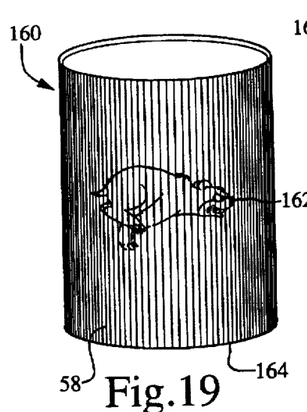
Figure 20:
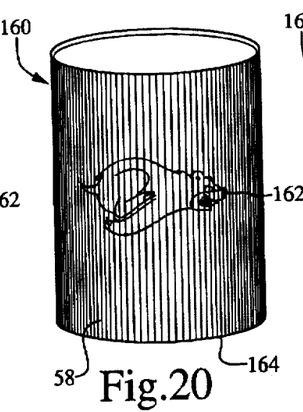
Figure 21:
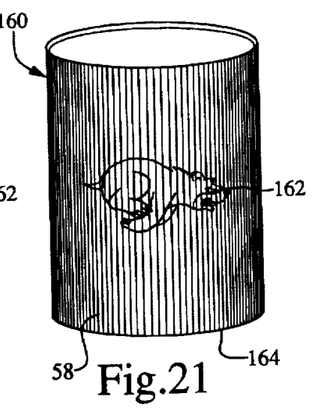
Figure 22:
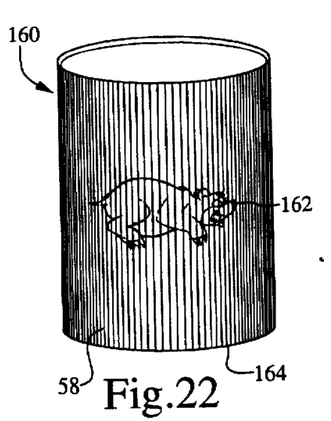

Referring now to FIGS. 14 and 15, there is illustrated a parallax barrier strip 150 (black line screen) substituted for the lenticular lens 34 shown in FIGS. 7 and 8. The barrier strip 150 acts as a "pin hole" lenticular when the linear slot opening 152 of the strip is positioned in the same location as the center of the lenticular arc (compare with FIGS. 7 and 8). The equations for calculating the positioned characteristics of the barrier strip 150 are the same as those described above with respect to the lenticular lenses for both the barrier pitch "P" and the screen thickness "C". The processes disclosed above may also be used with a barrier strip 150 as opposed to a lenticular lens in the formation of three dimensional images. The advantages of using a barrier strip 150 over a lenticular lens system are reduced manufacturing expense and wider image resolution angle. One trade off, however, of the barrier strip 150 system is that greater light intensity is needed for both recording the image on the film 42 and viewing the image on the substrate.

Reference is now made to FIGS. 16–22, wherein there is shown a second embodiment of the cylindrical three dimensional picture 160 of the present invention. As the picture 160 is rotated, such that it is viewed from a variety of different angles (eight of which are represented in FIGS. 16–22, respectively), the subject 162 appears to be encased within a viewing cylinder 164 and have 3D characteristics with respect to a background image (not shown). Furthermore, as the picture 160 is rotated, the observation angle on the subject 162 changes little, if any, but the positioning of the subject changes slightly to produce an animation effect.

Any of the foregoing methods for making cylindrical 3D pictures may be used to fabricate the animated 3D picture 160. The sequential images of the subject that are used for the picture 160 do not necessarily comprise images of the subject taken at different angles as discussed above, but rather comprise images taken of the subject moving through an ordered sequence of different positions (i.e., animated motion). In the alternative, the images may be selected from a short length of motion picture film taken of the subject moving through an ordered sequence of different positions. When these images are mounted to the cylinder 164 and viewed sequentially through the use of a lenticular lens 58 or parallax barrier strip 150 in the manner discussed above, the subject appears in the center of the cylinder, and can be viewed moving through the ordered sequence of positions by simply rotating the cylinder about its axis.

For example, referring again to FIG. 4, instead of taking a picture with camera 16 of the subject 12 as the subject is rotated, the camera takes a sequence of pictures of the subject while the subject moves (i.e., changes position) in an animated manner. Such movement could comprise, for example, running, jumping or waving just to name a few. Other animated movements suitable for recording and reproducing using the present invention are well known. Furthermore, referring again to FIGS. 5 and 11, an existing piece of motion picture or other film, perhaps of a popular sports figure or cartoon character in motion, could be used as the source material for the production of an animated 3D picture 160.

It will, of course, be understood that the quality of the animation effect provided by the present invention is dependent upon the quality of resolution of the lenticular lens 58 or parallax barrier strip 150 wrapped around the cylinder and used to resolve the sequence of images. As is shown in FIGS. 8–10, it is the characteristics of the lenticular lens 58 or parallax barrier strip 150 that determine the number of focal points 108, 110, and 112 that are available for recording each image in the sequence of images that show subject animation. The goal is to provide as many focal points for each lenticular as is possible in order to facilitate use of enough individual images in the sequence of images to show flowing motion in the animated image of the subject. Furthermore, proper registration between the lenticular lens and underlying photograph must be maintained.

Although preferred embodiments of the present invention have been illustrated in the accompanying Drawings and described in the foregoing Detailed Description, it is to be understood that the same is by way of illustration and example only and is not to be taken by way of limitation, the spirit and scope of the invention being limited only to the terms of the appended claims.

I claim:

1. A system for creating an animated image of a subject, comprising:

a photograph containing an ordered sequence of images of the subject photographed in animated motion, said images created using a film layer and an aperture between the film layer and the subject, the film layer used to produce the photograph;

a substrate having a cylindrical shape for supporting the photograph;

a lenticular lens having a plurality of lenticulars and positioned between the photograph and a viewer thereof, the width of the aperture equal to the subtended chord of a lens lobe angle 2 where $\angle°$ denotes the lens lobe angle and R equals the radius of the substrate plus the thickness of the lenticular lens, the lens lobe equal to 2, where P=1/L, L is the number of lenticulars per unit of circumference of the lens, and C=T−r, where T is the thickness of the lenticular lens and r is the radius of curvature of the lenticulars, wherein the images may be viewed in the ordered sequence in response to rotation of the substrate to create the animated image.

2. The system of claim 1, wherein the animated image appears to be within the cylinder defined by the substrate.

3. The system of claim 1, wherein the animated image appears to be located on the axis of the cylinder defined by the substrate.

4. The system of claim 1, wherein the animated image appears to be centered within the cylinder defined by the substrate.

5. The system of claim 1, wherein the thickness of the lens is the product of the index of refraction for the lens and the radius of curvature of the lenticulars.

6. The system of claim 1, wherein the lenticular lens is formed from polyvinyl chloride and T is approximately 2.7r.

7. The system of claim 1, wherein the lenticular lens formed from polysterene and T is approximately 2.43r.

8. A system for creating an animated image of a subject, comprising:

a photograph containing an ordered sequence of images of the subject photographed in animated motion, said images created using a film layer and an aperture between the film layer and the subject, the film layer used to produce the photograph;

a substrate having a cylindrical shape for supporting the photograph;

a parallax barrier strip positioned between the photograph and a viewer thereof, said parallax barrier strip having a plurality of linear slot openings, the width of the aperture equal to the subtended chord of a lobe angle, 2, where $\angle°$ denotes the lobe angle and R equals the radius of the substrate plus the thickness of the parallax barrier strip, the lobe equal to 2, where P=1/L, L is the number of linear slot openings per unit of circumference of the parallax barrier strip, and C=the thickness of the parallax barrier strip, wherein the images may be viewed in the ordered sequence in response to rotation of the substrate to create the animated image.

9. The system of claim 8, wherein the animated image appears to be within the cylinder defined by the substrate.

10. The system of claim 8, wherein the lobe angle is approximately seventy-two degrees.

11. A method for creating an animated image of a subject, comprising:

sequentially photographing the subject in animated motion to produce an ordered sequence of images;

exposing a photo emulsion to the ordered sequence of images using an aperture positioned between the photo emulsion and the images and using a lenticular lens having a plurality of lenticulars and positioned between the photo emulsion and the aperture;

developing the exposed photo emulsion;

mounting the developed photo emulsion on a cylindrical substrate, the width of the aperture equal to the subtended chord of a lens lobe angle, 2, where $\angle°$ denotes the lens lobe angle and R equals the radius of the substrate plus the thickness of the lenticular lens, the lens lobe angle equal to 2, where P=1/L, L is the number of lenticulars per unit of circumference of the lens, and C=T−r, where T is the thickness of the lenticular lens and r is the radius of curvature of the lenticulars; and positioning the lenticular lens between a viewer and the developed photo emulsion, wherein the images may be viewed in the ordered sequence in response to rotation of the substrate to create the animated image.

12. The system of claim 11, wherein the animated image appears to be within the cylinder defined by the substrate.

13. The system of claim 11, wherein the thickness of the lens is the product of the index of refraction for the lens and the radius of curvature of the lenticulars.

14. The system of claim 11, wherein the lens lobe angle is approximately seventy-two degrees.

15. The system of claim 11, wherein the lenticular lens is formed from polyvinyl chloride and T is approximately 2.7r.

16. The system of claim 11, wherein the lenticular lens is formed from polysterene and T is approximately 2.43r.

17. A method for creating an animated image of a subject, comprising:

sequentially photographing a subject in animated motion to produce an ordered sequence of images, said images created using a film layer and an aperture between the film layer and the subject;

exposing a photo emulsion to the ordered sequence of images using a parallax barrier strip having a plurality of linear slot openings;

developing the exposed photo emulsion;

mounting the developed photo emulsion on a cylindrical substrate; and positioning the parallax barrier strip between a viewer and the developed photo emulsion, the width of the aperture equal to the subtended chord of a lobe angle, 2, where $\angle°$ denotes the lobe angle and R equals the radius of the substrate plus the thickness of the parallax barrier strip, the lobe angle equal to 2, where P=1/L, L is the number of linear slot openings per unit of circumference of the parallax barrier strip, and C=the thickness of the parallax barrier strip, wherein the images may be viewed in the ordered sequence in response to rotation of the substrate to create the animated image.

18. The system of claim 17, wherein the animated image appears to be within the cylinder defined by the substrate.

19. The system of claim 1, wherein the lens lobe angle is approximately seventy-two degrees.

20. The system of claim 17, wherein the lobe angle is approximately seventy-two degrees.

\* \* \* \* \*